United States Patent
Goekay et al.

(10) Patent No.: US 11,445,014 B2
(45) Date of Patent: Sep. 13, 2022

(54) METHOD FOR OPERATING A HEARING DEVICE, AND HEARING DEVICE

(71) Applicant: Sivantos Pte. Ltd., Singapore (SG)

(72) Inventors: Umut Goekay, Koenigswinter (DE); Frank Naumann, Bubenreuth (DE)

(73) Assignee: Sivantos Pte. Ltd., Singapore (SG)

( * ) Notice: Subject to any disclaimer, the term of this patent is extended or adjusted under 35 U.S.C. 154(b) by 0 days.

(21) Appl. No.: 17/095,069

(22) Filed: Nov. 11, 2020

(65) Prior Publication Data
US 2021/0144201 A1    May 13, 2021

(30) Foreign Application Priority Data
Nov. 11, 2019   (DE) .......................... 10 2019 217 398

(51) Int. Cl.
*H04L 67/104*    (2022.01)
*H04R 25/00*    (2006.01)

(52) U.S. Cl.
CPC ...... *H04L 67/1051* (2013.01); *H04L 67/1046* (2013.01); *H04R 25/30* (2013.01); *H04R 25/554* (2013.01); *H04R 25/558* (2013.01)

(58) Field of Classification Search
CPC ............ H04L 67/1051; H04L 67/1046; H04R 25/554; H04R 25/558; H04R 25/30
See application file for complete search history.

(56) References Cited

U.S. PATENT DOCUMENTS

| | | | | |
|---|---|---|---|---|
| 8,073,171 | B2 * | 12/2011 | Haenggi ............... | H04R 25/554 381/315 |
| 8,553,666 | B2 * | 10/2013 | Palm ..................... | H04W 74/02 370/338 |
| 9,510,113 | B2 * | 11/2016 | Solum ................... | H04R 25/554 |
| 9,710,419 | B2 * | 7/2017 | Hug ....................... | H04R 25/55 |
| 9,820,323 | B1 | 11/2017 | Young et al. | |
| 9,949,038 | B2 | 4/2018 | Guindi et al. | |
| 9,949,040 | B2 | 4/2018 | Bergmann et al. | |
| 10,117,203 | B2 * | 10/2018 | Kindred ................ | H04R 25/554 |
| 2006/0067549 | A1 | 3/2006 | Puder et al. | |
| 2006/0067550 | A1 | 3/2006 | Puder et al. | |

(Continued)

FOREIGN PATENT DOCUMENTS

| | | |
|---|---|---|
| CN | 103299649 A | 9/2013 |
| CN | 105409245 A | 3/2016 |

(Continued)

*Primary Examiner* — Nam T Tran
(74) *Attorney, Agent, or Firm* — Laurence A. Greenberg; Werner H. Stemer; Ralph E. Locher

(57) ABSTRACT

A method for operating a hearing device is specified. The hearing device is assigned to a user and connected to other hearing devices, which are each assigned to another user, for data exchange in a common network. The hearing device or one of the other hearing devices controls the data exchange by subscribing to the network as a master, and wherein all other hearing devices subscribe to the network as a slave. It is decided whether the hearing device subscribes to the network as a master or as a slave by determining the operational capability of the hearing device and comparing it with the operational capability of the other hearing devices and by the hearing device acting as a master if the hearing device has the highest operational capability, and otherwise as a slave.

13 Claims, 2 Drawing Sheets

(56) References Cited

U.S. PATENT DOCUMENTS

| | | | |
|---|---|---|---|
| 2007/0009124 A1* | 1/2007 | Larsen | H04R 25/554 381/315 |
| 2010/0080398 A1 | 4/2010 | Waldmann | |
| 2010/0086152 A1* | 4/2010 | Rank | H04R 25/554 381/313 |
| 2012/0099594 A1 | 4/2012 | Lau et al. | |
| 2013/0343585 A1* | 12/2013 | Bennett | H04R 25/554 381/315 |
| 2014/0157280 A1* | 6/2014 | Yamauchi | G06F 9/46 718/103 |
| 2016/0157026 A1 | 6/2016 | Guindi et al. | |
| 2017/0311092 A1* | 10/2017 | Secall | H04R 25/554 |
| 2018/0205508 A1* | 7/2018 | Burchard | H04B 7/024 |
| 2019/0385593 A1* | 12/2019 | Rueckerl | H04R 25/554 |

FOREIGN PATENT DOCUMENTS

| | | |
|---|---|---|
| CN | 105722020 A | 6/2016 |
| CN | 109275069 A | 1/2019 |
| CN | 109983791 A | 7/2019 |
| DE | 102004047759 B3 | 6/2006 |
| EP | 1643801 A2 | 4/2006 |
| EP | 3101919 A1 | 12/2016 |

\* cited by examiner

METHOD FOR OPERATING A HEARING DEVICE, AND HEARING DEVICE

CROSS-REFERENCE TO RELATED APPLICATION

This application claims the priority, under 35 U.S.C. § 119, of German application DE 10 2019 217 398, filed Nov. 11, 2019; the prior application is herewith incorporated by reference in its entirety.

BACKGROUND OF THE INVENTION

Field of the Invention

The invention relates to a method for operating a hearing device and to a corresponding hearing device.

A hearing device is usually assigned to an individual user and is worn by the user in or on the ear to capture sound from the environment and to output it again in modified form. To this end the hearing device has a microphone, which captures the acoustic signals and converts them into an electrical input signal. This is fed to a signal processor of the hearing device for modification. As a result the signal processor outputs an electrical output signal, which is then converted back into sound via a receiver of the hearing device.

If multiple users each with a hearing device meet together at the same place, it can be useful for hearing devices to connect to each other in a network to exchange data. Hearing devices of different users that are connected together in a network are described, for example, in published, European patent applications EP 1 643 801 A2 and EP 3 101 919 A1, corresponding to U.S. patent publications 2006/0067550 and 2006/0067549 and U.S. Pat. No. 9,949,040.

Of particular importance is the coordination of the data exchange in the network. The problem that occurs in particular when connecting hearing devices in a common network is that the associated users are mobile and can be located in arbitrary positions, so that the composition of the network also changes spontaneously and dynamically. Individual hearing devices as nodes of the network either join or leave the network and the organization of the network and data exchange is therefore complicated.

BRIEF SUMMARY OF THE INVENTION

Against this background, an object of the invention is to improve the networking of hearing devices of different users in a common network. To this end, an improved method for operating a hearing device will be specified. An improved hearing device and a method for operating a network will also be specified.

The object is achieved according to the invention by a method having the features as claimed in the independent method claim and by a hearing device having the features as claimed in the independent hearing device claim. Furthermore, the object is achieved by a method for operating a network as claimed in independent method of operating a network claim. Advantageous configurations, extensions and variants form the subject matter of the dependent claims. The comments in connection with the method for operating a hearing device also apply mutatis mutandis to the hearing device and to the method for operating a network, and vice versa. If method steps are described in the following, advantageous configurations for the hearing device are obtained in particular by the fact that the latter is designed to execute one or more of these method steps.

The method is used to operate a hearing device which is also referred to as an ego hearing device. The hearing device is assigned to a user and is or will be connected to one or more other hearing devices, each assigned to another user, for data exchange in a common network. The ego hearing device does not necessarily have to differ from the other hearing devices, but it is also possible and suitable to combine different hearing devices in the same network. In this text, the invention is described specifically from the perspective of the ego hearing device, but the explanations apply analogously, in particular also to the other hearing devices.

In addition, in the present case only hearing devices which are explicitly assigned to different users are considered. A hearing device is, in particular, a monaural or binaural hearing aid. In the case of a monaural hearing aid, a user only wears a single device on only one side of the head, in the case of a binaural hearing aid, a user wears two individual devices on different sides of the head. All hearing devices subscribed to the network are hearing devices of different users, i.e. no two hearing devices are assigned to the same user. In other words, the connection of two individual devices of a binaural hearing aid of an individual user is not considered here and nor is it an object, but rather in the case of two individual devices of a binaural hearing aid these are collectively referred to as "a hearing device". The term "hearing device" here means all individual devices which are assigned to an individual user.

The hearing device or one of the other hearing devices controls the data exchange by subscribing to the network as a master. All other hearing devices are connected to the network as a slave. In other words, one of the hearing devices, i.e. the ego hearing device or another hearing device, is a master of the network, while the remaining hearing devices in the network are slaves, the communication of which is controlled by the master. In particular, the network only has a single master at any given time.

In the method, it is decided whether the hearing device, i.e. the ego hearing device, subscribes to the network as a master or a slave by determining an operational capability of the hearing device and comparing it with the operational capability of the other hearing devices, and by the hearing device subscribing as a master if the hearing device has the highest operational capability, and otherwise as a slave. The ego hearing device thus joins an existing network or forms a new network with one or more other hearing devices, so that the ego hearing device now has to be assigned a role, namely either master or slave. This assignment depends on the operational capability of the hearing device relative to the operational capability of each of the other hearing devices to which a connection is to be made via the network.

The invention is based on the observation that networking of hearing devices in a common network is initially unorganized, since the various hearing devices themselves regularly search the environment for other hearing devices and networks, and at first no fixed role distribution is specified until another hearing device or an existing network is found for networking them. Even an initially defined role distribution may need to be dynamically checked and adjusted if the network composition changes, i.e., if individual hearing devices join or leave the network. When setting up the connection, i.e. when connecting a hearing device to one or more other hearing devices, data collisions or error-prone transmissions can occur. Multiple hearing devices transmit on a specified channel, in particular frequency band, of the network. This channel often has a limited bandwidth. There is therefore a need to organize the network as uniquely as possible and to assign a defined role to each subscribing hearing device.

In the present network, one of the hearing devices is therefore assigned the role of a master, which controls and thus coordinates the data exchange throughout the network. All other hearing devices, on the other hand, are assigned the role of a slave, which rather than controlling the data exchange, is dependent on the control of the network by the master. This distribution of roles is implemented, in particular, as soon as at least two hearing devices are present together. For example, each hearing device regularly broadcasts a search signal which is received and confirmed by another hearing device, so that two hearing devices acquire knowledge of each other by mutual reception and confirmation and then form a network spontaneously and, in particular, automatically. A similar process applies when a hearing device joins an existing network.

Specifically when initially creating a network, but also in some cases when changing the composition of the network, it is then necessary to decide which hearing device in the network will control the data exchange and thus perform the organization and monitoring. In other words, one of the hearing devices must be selected as the master. This selection can in principle be made arbitrarily, for example by means of a random number which is generated by a particular hearing device and compared with the random number of the other hearing devices. In the present case, however, a specific selection is made which guarantees an improved operation of the network and thus a particularly reliable data exchange. This is achieved in this case because in the network, the hearing device which has the highest capacity is selected as the master. This capacity is expressed by the operational capability of a given hearing device compared to the operational capability of the other hearing devices. The operational capability indicates how secure and reliable the operation of the hearing device is at the given time, and preferably also how secure and reliable the operation of the hearing device is expected to be in the future. This ensures that the data exchange is controlled by the hearing device most capable of doing so.

The operational capability of the hearing device is derived in particular from an operating parameter of the hearing device. The operating parameter is a variable that typically changes dynamically during the operation of the hearing device, thereby indicating a specific condition of the hearing device at a given time. In particular, the operating parameter quantifies an operationally relevant characteristic of the hearing device or component of the hearing device. The operating parameter is also directly or indirectly a measure of the current and/or future performance of the hearing device with regard to its functionality in the network. This makes the operating parameter particularly suitable for determining whether the hearing device is suitable as a master or whether another hearing device is more suitable.

In a particularly advantageous design, the operational capability is determined by a charge state of an energy storage unit of the hearing device, so that the hearing device subscribes to the network as a master if the charge state of the hearing device is greater than the charge state of all other hearing devices in the network, and otherwise as a slave. This ensures that the hearing device with the largest energy reserve controls data exchange, ensuring the longest possible operation of the network. The state of charge is an operating parameter of the hearing device. In the operation of the hearing device, the state of charge constantly decreases due to the hearing device performing one or more functions, e.g. modification in a signal processor or outputting sound via a receiver. Specifically in the case of a gateway, it can typically—but not necessarily—be assumed that the energy consumption will increase due to the additional function of controlling the data exchange and that the state of charge will be reduced correspondingly faster compared to the role as a slave. Therefore, it is appropriate to select and configure the hearing device with the highest charge level as the master.

In an advantageous design, the operational capability is determined based on a transmission quality of the hearing device with respect to transmission and reception, so that the hearing device subscribes to the network as a master if the transmission quality of the hearing device is greater than the transmission quality of all other hearing devices in the network, and otherwise as a slave. This ensures that the hearing device which has the best transmission quality, i.e. transmission quality or reception quality or both, controls the data exchange. For example, the transmission quality is quantified by an average signal strength with which the hearing device receives data from or sends data to other hearing devices, or both. For example, the transmission quality depends on the position of a hearing device relative to the other hearing devices and to obstacles that may be present. Furthermore, the transmission quality depends, for example, on the type and design of an antenna of the hearing device which is used for transmitting and/or receiving during the data exchange.

In an advantageous design, the operational capability is determined based on an error rate in the data exchange, so that the hearing device subscribes to the network as a master if the error rate of the hearing device is lower than the error rate of all other hearing devices in the network, and otherwise as a slave. This ensures that the data exchange is as error-free as possible. A high error rate requires frequent retransmission of data, in other words a redundant transmission, which is correspondingly inefficient. Therefore, the hearing device with the lowest error rate is selected as the master. This is also beneficial if a user whose hearing device is currently the master moves away and wants to leave the network, in which case the error rate automatically increases, so that a new master is thus automatically selected. For example, the error rate is a bit error rate. Similarly to the transmission quality, the error rate depends, for example, on the position of a hearing device relative to the other hearing devices, and specifically on the distance to the other hearing devices.

A combination of more than one of the above approaches for determining the operational capability is also advantageous, so that it is determined depending on multiple different operating parameters of a hearing device. For example, in this case the different operational parameters are treated with different priorities.

The hearing device, i.e. the ego hearing device, is preferably selected as the new master of the network if the hearing device joins the network and the network already has an old master, but its operational capability is worse than the operational capability of the hearing device, so that from now on the old master subscribes to the network as a slave. If, on the other hand, the operational capability of the ego hearing device is worse than that of the old master, this remains the master of the network and the ego hearing device subscribes as a slave.

In the event that the hearing device, i.e. the ego hearing device, is already subscribed to the network as the master and a new hearing device joins the network, it is decided once again whether the hearing device subscribes to the network as a master or as a slave. This essentially corresponds to the case described earlier of the ego hearing device joining a network, but now from a different perspective in which the ego hearing device is already subscribed to the network and a new, potentially more capable, node joins it. If the new hearing device has a higher operational capability, the role of the master is ceded to it, otherwise the new hearing device joins as a slave.

In the event that the hearing device, i.e. the ego hearing device, is already subscribed to the network as a slave and the master leaves the network, it is preferably decided once again whether the hearing device subscribes to the network as a master or a slave. If the ego hearing device has the highest operational capability after the previous master has left the network, the ego hearing device assumes the role of the master. Otherwise, whichever of the other hearing devices has the highest operational capability is selected as the master.

The mechanisms described above for the case of a hearing device departing or joining the network will ensure that in the network, the hearing device with the highest operational capability always assumes control of the data exchange and is or remains selected as the master, so that even if the composition of the network is changed dynamically, an optimal data exchange is ensured.

A search mode of the hearing device is activated if it is not currently subscribed to a network, wherein in the search mode the hearing device preferably periodically emits a search signal which contains the operational capability of the hearing device, so that this can be received by another hearing device and compared with the operational capability of that device. In other words, while the hearing device is not yet subscribed in a network, a search mode is activated in which the hearing device searches for one or more other hearing devices in order to form a network with these or to join an existing network. In the search mode, the hearing device broadcasts a search signal periodically. The search signal is preferably an electromagnetic radio signal. The search signal is preferably a data signal, i.e. it contains information from the hearing device or about the hearing device, or both. In the present case, the search signal contains the operational capability of the hearing device. However, this is not mandatory for mere participation in the network, instead it is sufficient for this purpose if the search signal is a simple detection signal, e.g. an identification number or simply a test signal. However, if, as described here, the operational capability of the device is broadcast in the search mode, another hearing device can receive it and compare it with its own operational capability.

Conversely, in the search mode, the hearing device advantageously listens to whether one or more other hearing devices are within range and, if possible, receives their search signals, in particular in order to compare the respective operational capability of the other hearing devices with its own operational capability. In the search mode, the listening and sending are completely independent of each other, so that in the search mode the hearing device listens or sends, or both. The two functions of listening and sending in the search mode are advantageously activated in different ways and not necessarily in common.

The search mode is preferably activated by the hearing device detecting speech, i.e. the presence of speech in the current environment. The detection is performed in particular by a microphone of the hearing device picking up sound from the environment and generating an electrical input signal from it, which is fed to an analysis unit which is part of the signal processor, for example. In a possible application situation, at least two hearing device users spontaneously gather together and begin a conversation. The hearing devices of the users are not yet coupled to each other, so they do not yet form a common network. Preferably, the search mode of a particular hearing device is then triggered by the device detecting speech via its microphone, e.g. the voice of the hearing device user or the voice of another person. If the hearing device, hereafter the first hearing device, detects the voice of its assigned user, e.g. by means of an own-voice detection system of the signal processor, then this hearing device sends out a search signal, which also contains, in particular, the operational capability of the hearing device, and searches for other hearing devices in the surrounding area, potentially the hearing device of a conversation partner of the user. Alternatively or additionally, it is also conceivable and suitable if a hearing device sends out a search signal as soon as it detects a voice that is certainly not the voice of the assigned user, i.e. a strange voice.

If the other user is also wearing a hearing device, hereafter the second hearing device, this is also in the search mode and will thus hear whether there is a hearing device located nearby. The second hearing device hears the search signal of the first hearing device. In particular, the second hearing device also detects the operational capability of the first hearing device and compares it with its own operational capability, which is also advantageously transmitted, namely as a response signal, in order to be received by the first hearing device and likewise compared with the latter's own operational capability. In this way, both hearing devices determine which one is selected as the master and which as the slave. A common network is then formed with the appropriate role distribution. Alternatively, the second hearing device does not transmit its operational capability to the first hearing device itself, but determines the role distribution alone and then communicates it to the first hearing device by means of a response signal, so that the first hearing device does not have to compare the two operational capabilities with each other, but is directly informed of its role. In the network that has now been formed, the master controls the data exchange and thus assumes the coordination of the data communication.

If another user with a third hearing device is added, this is initially also in the search mode and detects the already existing network. From the data exchanged in the network between the first and the second hearing device, the third hearing device detects which hearing device is the master and then logs onto it. As already described, in an advantageous design a test is carried out to determine whether the third hearing device should now assume the role of master or subscribe to the network as a slave.

The master in the network preferably maintains a list of nodes, in which all current nodes on the network are listed.

Preferably, the master also periodically monitors the respective operational capability of each hearing device in the network and, if necessary, transfers control of the data exchange to a more suitable node, as described above.

In a suitable design, the data exchanged over the network during the data exchange is audio data, i.e. the speech of the users. The audio data is obtained by a hearing device acquiring the speech of the assigned user. This acquired speech is then transmitted to the other hearing devices via the network. A kind of telephone connection of the hearing devices is then implemented using the network. This is advantageous in noisy or high-interference environments where the transmission of sound through the air and the understanding of direct speech are difficult. Alternatively or additionally, the data are control data for the hearing devices in the network, or other information.

Preferably, the network is a decentralized and relay-free network, in which the hearing devices are directly connected to each other. The hearing devices are connected to each other in the manner of a peer-to-peer network, with the difference that one of the hearing devices controls the data exchange as the master. On the other hand, additional devices which are not hearing devices are omitted, at least for the data exchange between the hearing devices. Instead, the data exchange takes place directly between the hearing devices and therefore not via additional relay stations, hubs, routers or the like. The network is thus a true hearing device network. The use of additional devices which are not hearing devices is inherently advantageous, however.

Preferably, the network is a wireless network. This means that a given hearing device has a corresponding wireless interface for data exchange, e.g. a WLAN, Bluetooth or radio antenna.

The network is either a public or a private network. In a public network, unlike a private network, no authentication is required.

An open network with a plurality of hearing devices is preferably set up automatically as soon as multiple hearing devices are within a suitable range of each other. The range from which an automatic connection can be established is determined in particular by the transmission range of the hearing devices. An open network is appropriately only used to exchange non-sensitive data, e.g. for matching parameters or settings of the hearing devices or for the joint collection of data, particularly environment data. It is also advantageous to integrate one or more so-called information hotspots as additional nodes of the network. No active user of the network is assigned to an information hotspot, rather it is preferably permanently installed hardware via which information can be exchanged between the hearing devices, e.g. general information about a location, for example a railway station. Alternatively or additionally, an emergency call can be sent via an information hotspot if necessary. Ideally, as an alternative or in addition, an information hotspot is used to increase the transmission range of the hearing devices, i.e. as a kind of relay for the data exchange.

A private network is also known as a closed network. Such a network presents the challenge that the nodes must be explicitly defined, since it is not necessarily the case that every possible hearing device in range should actually subscribe to the private network. Therefore, an authentication is performed to allow a hearing device to subscribe to the network. In an advantageous design this is carried out by means of a subscriber directory. In the subscriber directory, in a suitable design one or more contacts are stored, wherein each contact corresponds to a hearing device, so that the subscriber directory is a kind of telephone directory. Any hearing device is then designed in such a way that, based on the list of subscribers those hearing devices to which the user wants to connect his/her own hearing device in a shared, private network can be selected for its user as soon as they are within range. Alternatively or additionally, the subscriber directory contains all hearing devices currently in range. The user of a hearing device then uses the subscriber directory to grant permission to a hearing device within range to connect to their own hearing device in a shared, private network.

Also advantageous is a design in which all currently available networks are indicated in a network directory, so that by means of an active request to one of the networks the user can connect his/her own hearing device to the hearing devices of this network. The request is accepted or rejected by a node of the network, for example, by any user of a hearing device on the network or by a group administrator.

As an alternative or in addition to accepting or rejecting a request, a group administrator may advantageously perform one or more other functions, such as creating a group of users that are allowed to join the network, in particular automatically, dissolving a group of users, or adding or excluding individual users to or from a group.

An arrangement in which it is possible to rate subscribers is also advantageous, more specifically to rate the individual users of the hearing devices in a network. If a user were to show unacceptable behavior, the other users in the network can rate this user negatively and thereby exclude them or make the conditions for rejoining more difficult, or completely prohibit rejoining in future. This ensures that users behave appropriately in the network.

A hearing device according to the invention is designed to carry out a method as described above. For this purpose, the hearing device appropriately contains a control unit, which is configured in such a way that it carries out the corresponding method. In the control unit, the method is implemented, in particular, in software or circuit technology, or a combination of these. For example, the control unit is configured as a microprocessor or as an ASIC or a combination of these.

The hearing device is preferably a binaural hearing aid and thus contains two separate devices, which are worn by the user on different sides, i.e. in or on the left and right ears.

The hearing aid is preferably used for treating a hearing-impaired user. To this end, the hearing aid has a microphone which captures sound from the surroundings and generates an electrical input signal. This is fed to a signal processor of the hearing device for modification. The modification takes place in particular on the basis of an individual audiogram of the user which is assigned to the hearing device, so that an individual hearing deficit of the user is compensated. As a result the signal processor outputs an electrical output signal, which is then converted back into sound and output to the user via a receiver of the hearing aid.

The object of the invention is also achieved by a method for operating a network having a plurality of hearing devices assigned to different users, wherein one of the hearing devices is selected as a master for controlling a data exchange between the hearing devices, and wherein all other hearing devices are selected as slaves, wherein the hearing device which has the highest operational capability compared to the other hearing devices is selected as the master. The master is selected either while the network is being reformed or when the network is already in existence. The above explanations regarding the method and the hearing device also apply analogously to the network and the hearing devices that subscribe to or will subscribe to this network.

Other features which are considered as characteristic for the invention are set forth in the appended claims.

Although the invention is illustrated and described herein as embodied in a method for operating a hearing device, and a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
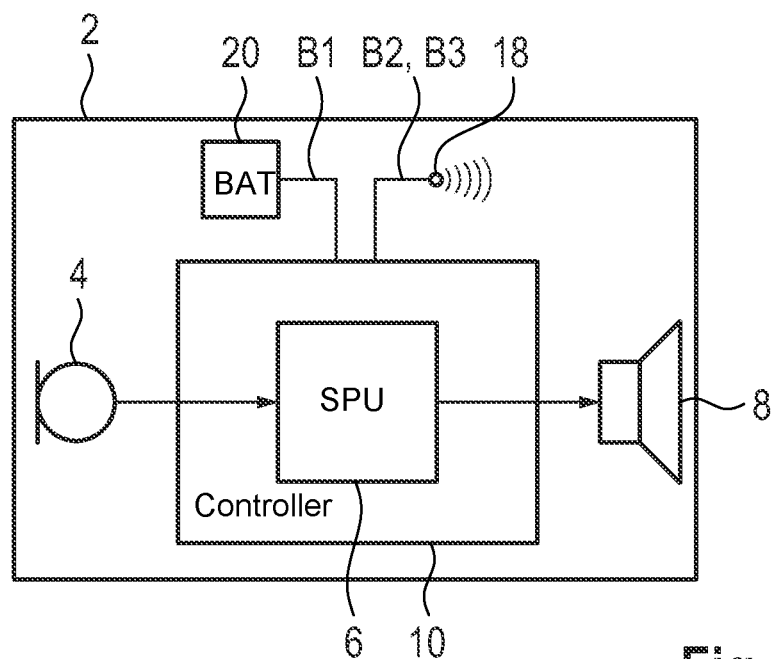
FIG. 1 is a block diagram of a hearing device according to the invention.

Referring now to the figures of the drawings in detail and first, particularly to FIG. 1 thereof, there is shown a hearing device 2 that has a microphone 4, which captures sound from the environment and generates an electrical input signal. This is fed to a signal processor 6 of the hearing device 2 for modification. The modification is carried out in particular on the basis of an individual audiogram of the user N which is assigned to the hearing device 2, so that an individual hearing deficit of the user N is compensated. The result of the signal processor 6 is to output an electrical output signal, which is then converted back into sound via a receiver 8 of the hearing device 2 and output to the user N.

The hearing device 2 also has a control unit 10, which is configured in such a way that it carries out a method for operating the hearing device 2, an example of which is described below by reference to FIGS. 2 to 4. The hearing device 2 subscribes to a network 12 as a master or slave for exchanging data with other hearing devices 14, 16 assigned to other users O, P. The example network 12 shown is a wireless network 12. This means that a given hearing device 2, 14, 16 has a corresponding wireless interface 18 for data exchange, e.g. a WLAN, Bluetooth or radio antenna.

Figure 2:
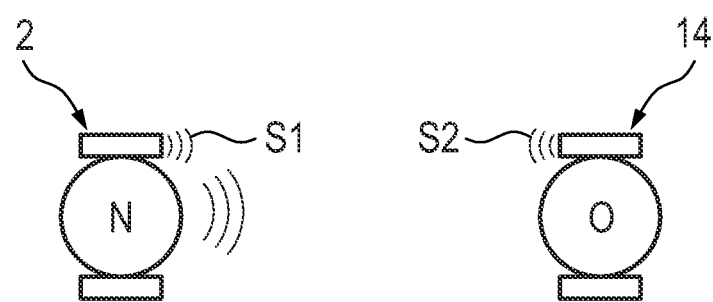
FIG. 2 is an illustration showing two users with hearing devices.
Figure 3:
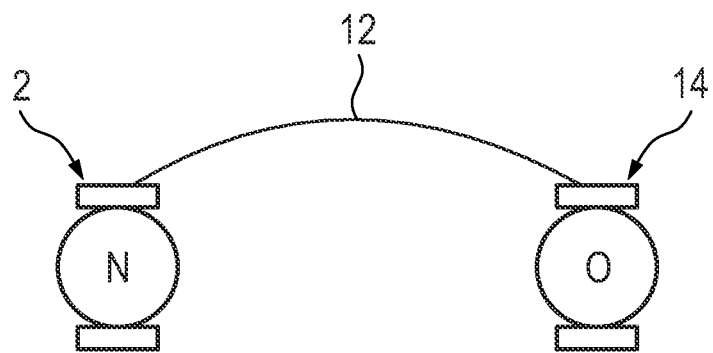
FIG. 3 is an illustration showing the users of FIG. 2, wherein their hearing devices form a network.
Figure 4:
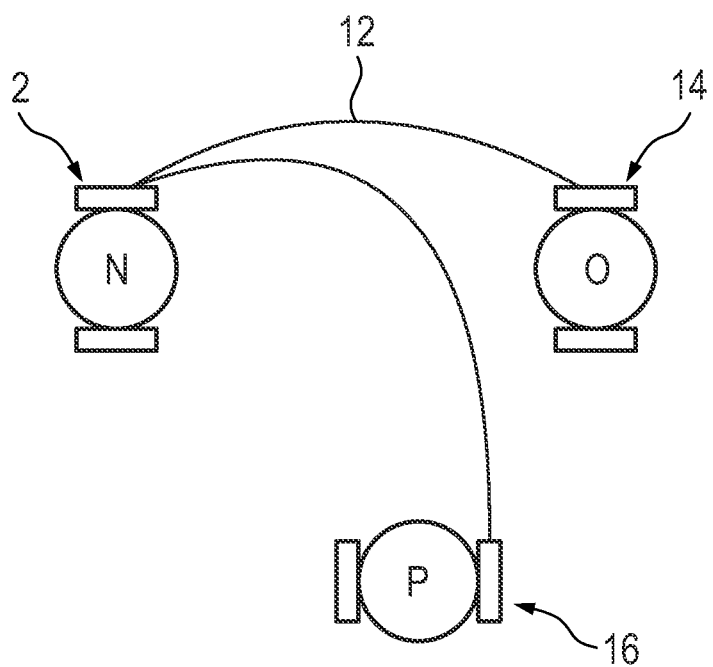
FIG. 4 is an illustration showing the network of FIG. 3, to which a third hearing device is subscribed.

The hearing devices 2, 14, 16 shown in FIGS. 2 to 4 are preferably binaural hearing aids and thus each comprise two separate devices, which are worn by the user N, O, P on different sides, i.e. in or on the left and right ears. For example, an individual device is designed as shown in FIG. 1.

In a method for operating the hearing aid 2, which is also referred to as an ego hearing aid 2, this is assigned to a user N and is or will be connected to one or more other hearing devices 14, 16, each assigned to another user O, P, for the data exchange in a common network 12. The hearing device 2 or one of the other hearing devices 14, 16 controls the data exchange by subscribing to the network 12 as a master. All other hearing devices 2, 14, 16 each subscribe to the network 12 as a slave. In doing so it is decided whether the hearing device 2 subscribes to the network 12 as a master or a slave by determining the operational capability of this hearing device 2 and comparing it with the operational capability of the other hearing devices 14, 16. The hearing device 2 then subscribes as a master if the hearing device 2 has the highest operational capability, and otherwise as a slave. The hearing device 2 thus joins an existing network 12 or forms a new network 12 with one or more other hearing devices 14, 16, so that the hearing device 2 must now be assigned a role, either master or slave. This assignment is made depending on the operational capability of the hearing device 2 relative to the other hearing devices 14, 16 to which a connection is to be made via the network 12. The operational capability indicates how secure and reliable the operation of the hearing device 2 is at the given time, and preferably also how secure and reliable the operation of the hearing device 2 is expected to be in the future. This ensures that the data exchange is controlled by the hearing device 2, 14, 16 most capable of doing so.

The operational capability of the hearing device is derived from an operating parameter B of the hearing device 2. The operating parameter B1, B2, B3 is a variable that typically changes dynamically during operation of the hearing device 2, thereby indicating a specific condition of the hearing device 2. The operating parameter B1, B2, B3 is also directly or indirectly a measure of the current and/or future performance of the hearing device 2 with regard to its functionality in the network 12.

For example, the operational capability is determined based on a charge state B1 of an energy storage unit 20 of the hearing device 2, so that the hearing device 2 subscribes to the network 12 as a master if the charge state B1 of the hearing device 2 is greater than the charge state B1 of all other hearing devices 14, 16 in the network 12, and otherwise as a slave. The state of charge B1 is an operating parameter B1 of the hearing device 2.

Alternatively or additionally, the operational capability is determined based on a transmission quality B2 of the hearing device 2 with respect to transmission and reception of data over the network 12, so that the hearing device 2 subscribes to the network 12 as a master if the transmission quality B2 of the hearing device 2 is greater than the transmission quality B2 of all other hearing devices 14, 16 in the network 12, and otherwise as a slave. This ensures that the hearing device 2 which has the best transmission quality or reception quality, or both, controls the data exchange. For example, the transmission quality B2 is an average signal strength with which the hearing device 2 receives data from or sends data to other hearing devices 14, 16, or both, via the wireless interface 20. The transmission quality B2 is an operating parameter B2 of the hearing device 2.

Alternatively or additionally, the operational capability is determined based on an error rate B3 in the data exchange, so that the hearing device 2 subscribes to the network 12 as a master if the error rate B3 of the hearing device 2 is lower than the error rate B3 of all other hearing devices 14, 16 in the network 12, and otherwise as a slave. The error rate B3 is an operating parameter B3 of the hearing device 2 and is, for example, a so-called bit error rate.

The application of the specific concept for the selection of the master based on the operational capability of the hearing devices 2, 14, 16 becomes clear from the exemplary application case of FIGS. 2 to 4.

FIG. 2 shows a possible initial situation in which two users N, O of hearing devices 2, 14 spontaneously come together and start a conversation. The hearing devices 2, 14 are not yet coupled with each other, so they do not yet form a common network 12. Therefore, a search mode is activated, in which the respective hearing device 2, 14 searches for one or more other hearing devices 2, 14, 16 in order to form a network 12 with these as shown in FIG. 3 or to join an already existing network 12 as shown in FIG. 4.

In the search mode, the hearing device 2, 14, 16 periodically emits a search signal which in this case also contains the operational capability of the hearing device 2, 14, 16, so that this can be received by another hearing device 2, 14, 16 and compared with the operational capability thereof. Conversely, in the search mode the hearing device 2, 14, 16 advantageously listens to whether one or more other hearing devices 2, 14, 16 are within range and, if appropriate, receives their search signals S1 in order to compare the respective operational capability of the other hearing devices with its own operational capability. In the search mode, the listening and sending can be activated completely independently of each other, so that in the search mode the hearing device 2, 14, 16 listens or sends, or both.

In FIG. 2, the search mode of the hearing devices 2, 14 is triggered by the fact that they detect the voices of the users N, O via their microphones 4. In this case, the first hearing device 2 detects the voice of its assigned user N, e.g. by means of an own-voice detection, not explicitly shown, as part of the control unit 10. The hearing device 2 then emits a search signal S1 which also contains the operational capability of the hearing device 2, and searches for other hearing devices 14, 16 in the surrounding area, potentially the hearing device 14 of a conversation partner, here the user O. In an embodiment not shown, alternatively or additionally the hearing device 2 emits a search signal S1 as soon as it detects a voice that is not the voice of the assigned user N, i.e. a strange voice, e.g. that of the user O.

In the exemplary embodiment of FIG. 2, the other user O also wears a hearing device 14, namely the second hearing device 14. This device is also in the search mode and can hear if there is a hearing device 2, 16 located nearby. The second hearing device 14 hears the search signal S1 of the first hearing device 2, thereby detects the operational capability of the first hearing device 2 and compares it with its own operational capability. In a possible design this is emitted as a response signal S2, in order to be received by the first hearing device 2 and likewise compared with its own operational capability. In this way, both hearing devices 2, 14 determine which one is selected as the master and which as the slave. As shown in FIG. 3, a common network 12 is then formed with the appropriate role distribution. Alternatively, the second hearing device 14 does not transmit its operational capability to the first hearing device 2 itself, but determines the role distribution alone and then communicates it to the first hearing device 2 by means of a response signal S2, so that the first hearing device does not have to compare the two operational capabilities with each other, but receives its role directly. In the network 12 now formed, the master controls the data exchange and thus assumes the coordination of the data communication.

FIG. 4 shows the case where starting from the network of FIG. 3, a third user P is added, with a third hearing device 16, which also joins the network 12. In FIG. 4, by way of example the first hearing device 2 is the master. The third hearing device 16 is initially in search mode as described and detects the existing network 12. From the data exchanged between the first and the second hearing device 2, 14 in the network 12, the third hearing device 16 detects which hearing device 2, 16 is the master and then logs on to it.

If the hearing device 16 joins the network 12 and this network 12 already has an old master, namely one of the hearing devices 2, 14, the operational capability of which is worse than that of the hearing device 16, this third hearing device 16 will then be selected as the new master of the network 12 and from then on the old master will be subscribed to the network 12 as a slave. In the case shown, however, the operational capability of the newly added hearing device 16 is worse than that of the old master, namely the first hearing device 2, so that this remains the master of the network 12 and the hearing device 16 subscribes as a slave. The same applies in the case where the hearing device 2 joins an already existing network 12.

Accordingly, if in the present case it turns out that the hearing device 2 is already subscribed to the network 12 as a master and the third hearing device 16 joins the network 12 as a new hearing device, it is preferably decided once again whether the hearing device 2 will from now on subscribe to the network 12 as a master or a slave. If the third, new hearing device 16 has a higher operational capability, the role of the master is ceded to this device, otherwise the new hearing device 16 joins as a slave.

In the case, not explicitly shown, that the first hearing device 2 is already subscribed to the network 12 as a slave and the master, e.g. the second or third hearing device 14, 16 leaves the network 12, it is also decided once again whether the hearing device 2 will from now on subscribe to the network 12 as a master or a slave. If the first hearing device 2 has the highest operational capability in the network 12 after the previous master has left, the first hearing device 2 assumes the role of the master. Otherwise, whichever of the other hearing devices 14, 16 has the highest operational capability is selected as the master.

The data transferred over the network during the data exchange in the present case is audio data, i.e. the speech of the users N, O, P. The audio data is obtained by a hearing device 2, 14, 16 acquiring the speech of the assigned user N, O, P. This acquired speech is then transmitted via the network 12 to the other hearing devices 2, 14, 16. A kind of telephone connection of the hearing devices 2, 14, 16 is then implemented using the network 12. Alternatively or additionally, the data are control data for the hearing devices 2, 14, 16, or other items of information.

In the exemplary embodiment shown, the network 12 is a decentralized and relay-free network 12, in which the hearing devices 2, 14, 16 are directly connected to each other. The hearing devices 2, 14, 16 are connected to each other in the form of a peer-to-peer network, with the difference that one of the hearing devices 2, 14, 16 controls the data exchange as the master. On the other hand, additional devices which are not hearing devices are omitted, at least for the data exchange between the hearing devices 2, 14, 16. Instead, the data exchange takes place directly between the hearing devices 2, 14, 16 and therefore not via additional relay stations, hubs, routers or the like. The network 12 is therefore a true hearing device network 12.

The following is a summary list of reference numerals and the corresponding structure used in the above description of the invention:

2 hearing device, ego hearing device, first hearing device
4 microphone
6 signal processor
8 receiver
10 control unit
12 network
14 other hearing device, second hearing device
16 other hearing device, third hearing device
18 wireless interface
20 energy storage unit
B1 operating parameter, state of charge
B2 operating parameter, transmission quality
B3 operating parameter,
N user of the first hearing device
O user of the second hearing device
P user of the third hearing device
S1 search signal
S2 response signal

The invention claimed is:
1. A method for operating a hearing device, which comprises the steps of:
assigning the hearing device to a user and the hearing device is or will be connected to other hearing devices each assigned to another user, for data exchange in a common network, wherein:
- the hearing device or one of the other hearing devices controls the data exchange by subscribing to the common network as a master, and all the other hearing devices each subscribe to the common network as a slave, the decision of whether the hearing device subscribes to the common network as a master or as a slave being made before the hearing device joins the common network, the common network being a decentralized and relay-free network, in which the hearing device and the other hearing devices are directly connected to each other, and additional devices which are not hearing devices are omitted from the network, at least for a data exchange between the hearing devices;
- it is decided whether the hearing device subscribes to the network as the master or as the slave by determining an operational capability of the hearing device and comparing it with the operational capability of the other hearing devices, and by the hearing device subscribing as the master if the hearing device has a highest operational capability, and otherwise as the slave;
- a search mode of the hearing device is activated if it is not currently subscribed to the common network; and
- in the search mode the hearing device emits a search signal, which contains the operational capability of the hearing device so that it can be received by another hearing device and compared with the operational capability thereof.

2. The method according to claim 1, which further comprises determining the operational capability based on a charge state of an energy storage unit of the hearing device, so that the hearing device subscribes to the common network as the master if the charge state of the hearing device is greater than the charge state of all the other hearing devices in the common network, and otherwise as the slave.

3. The method according to claim 1, which further comprises determining the operational capability based on a transmission quality of the hearing device with respect to transmission and reception of data over the common network, so that the hearing device subscribes to the common network as the master if the transmission quality of the hearing device is greater than the transmission quality of all the other hearing devices in the common network, and otherwise as the slave.

4. The method according to claim 1, which further comprises determining the operational capability based on an error rate in the data exchange, so that the hearing device subscribes to the common network as the master if the error rate of the hearing device is lower than the error rate of all the other hearing devices in the common network, and otherwise as the slave.

5. The method according to claim 1, which further comprises selecting the hearing device as a new master of the common network if the hearing device joins the common network and the common network already has an old master, but the operational capability thereof is worse than the operational capability of the hearing device, so that from now on the old master subscribes to the common network as the slave.

6. The method according to claim 1, wherein in an event that the hearing device is already subscribed to the common network as the master and a new hearing device joins the common network, it is decided once again whether the hearing device subscribes to the common network as the master or as the slave.

7. The method according to claim 1, wherein in an event that the hearing device is already subscribed to the common network as the slave and the master leaves the common network, it is decided once again whether the hearing device subscribes to the common network as the master or as the slave.

8. The method according to claim 1, wherein in the search mode, the hearing device listens to whether the other hearing devices are within range and receives their search signals in order to compare a respective operational capability of the other hearing devices with its own said operational capability.

9. The method according to claim 1, wherein during the data exchange over the common network, audio data is exchanged which is obtained by acquiring a speech of the assigned user by means of the hearing device.

10. The method according to claim 1, wherein the common network is a wireless network.

11. A hearing device, comprising:
- a controller configured to carry out a method according to claim 1.

12. A method for operating a hearing device, which comprises the steps of:
- assigning the hearing device to a user and the hearing device is or will be connected to other hearing devices each assigned to another user, for data exchange in a common network, wherein:
  - the hearing device or one of the other hearing devices controls the data exchange by subscribing to the common network as a master, and all the other hearing devices each subscribe to the common network as a slave, the decision of whether the hearing device subscribes to the common network as a master or as a slave being made before the hearing device joins the common network;
  - it is decided whether the hearing device subscribes to the network as the master or as the slave by determining an operational capability of the hearing device and comparing it with the operational capability of the other hearing devices, and by the hearing device subscribing as the master if the hearing device has a highest operational capability, and otherwise as the slave;
  - a search mode of the hearing device is activated if it is not currently subscribed to the common network;
  - in the search mode the hearing device emits a search signal, which contains the operational capability of the hearing device so that it can be received by another hearing device and compared with the operational capability thereof; and
  - the search mode is activated by the hearing device detecting a voice that is not the voice of an assigned user of the hearing device.

13. A method for operating a network having a plurality of hearing devices assigned to different users, which comprises the steps of:
- selecting one of the hearing devices as a master, for controlling a data exchange between the hearing devices, and wherein all other ones of the hearing devices are selected as a slave, wherein the hearing device having a highest operational capability compared to the other hearing devices is selected as the master, the decision of whether a particular hearing device subscribes to the common network as a master or as a slave being made before the particular hearing device joins the common network, the common network being a decentralized and relay-free network, in which the hearing device and the other hearing devices are directly connected to each other, and additional devices which are not hearing devices are omitted from the network, at least for a data exchange between the hearing devices; and activating a search mode of the hearing device if it is not currently subscribed to the network, wherein in the search mode the hearing device emits a search signal which contains the operational capability of the hearing device so that it can be received by another hearing device and compared with the operational capability thereof.

* * * * *